United States Patent
Jesionowski

(10) Patent No.: US 9,013,822 B2
(45) Date of Patent: *Apr. 21, 2015

(54) CREATING A SINGLE LIBRARY IMAGE FROM MULTIPLE INDEPENDENT TAPE LIBRARIES

(71) Applicant: International Business Machines Corporation, Armonk, NY (US)

(72) Inventor: Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,392

(22) Filed: Jan. 16, 2014

(65) Prior Publication Data

US 2014/0136775 A1    May 15, 2014

Related U.S. Application Data

(63) Continuation of application No. 12/895,742, filed on Sep. 30, 2010, now Pat. No. 8,767,334.

(51) Int. Cl.
| | |
|---|---|
| G11B 17/00 | (2006.01) |
| G06F 12/00 | (2006.01) |
| G06F 3/06 | (2006.01) |
| G11B 15/68 | (2006.01) |

(52) U.S. Cl.
CPC ............ *G06F 3/0686* (2013.01); *G11B 15/689* (2013.01); *G06F 3/0617* (2013.01); *G06F 3/0647* (2013.01)

(58) Field of Classification Search
None
See application file for complete search history.

(56) References Cited

U.S. PATENT DOCUMENTS

| | | |
|---|---|---|
| 5,745,748 A | 4/1998 | Ahmad et al. |
| 6,574,641 B1 | 6/2003 | Dawson et al. |
| 6,604,165 B1 | 8/2003 | Terao |
| 6,848,007 B1 | 1/2005 | Reynolds et al. |
| 6,988,149 B2 | 1/2006 | Odenwald |
| 7,506,073 B2 | 3/2009 | Kuik et al. |
| 7,526,527 B1 | 4/2009 | Woodruff |
| 7,680,979 B2 | 3/2010 | Wideman et al. |
| 8,767,334 B2 | 7/2014 | Jesionowksi |
| 2002/0029281 A1 | 3/2002 | Zeidner et al. |
| 2003/0084240 A1* | 5/2003 | Torrey et al. ................. 711/114 |
| 2003/0126395 A1 | 7/2003 | Camble et al. |
| 2005/0138184 A1 | 6/2005 | Amir |
| 2008/0320134 A1 | 12/2008 | Edsall et al. |
| 2009/0037565 A1 | 2/2009 | Andresen et al. |
| 2009/0222733 A1 | 9/2009 | Basham et al. |
| 2010/0114361 A1 | 5/2010 | Starr et al. |
| 2010/0199061 A1 | 8/2010 | Justiss et al. |
| 2012/0084500 A1 | 4/2012 | Jesionowski |

FOREIGN PATENT DOCUMENTS

| | | |
|---|---|---|
| CN | 1637722 | 7/2005 |

* cited by examiner

*Primary Examiner* — Andrew L Sniezek
(74) *Attorney, Agent, or Firm* — Zilka-Kotab, PC

(57) ABSTRACT

A system according to one embodiment includes a plurality of logical libraries configured to store sequential access media therein, a plurality of shuttle cars, and one or more shuttle pathways for the shuttle cars. The shuttle cars are for transporting a sequential access medium between the plurality of logical libraries. Each of the logical libraries comprises at least one local station for sending and/or receiving shuttle cars to and/or from the plurality of logical libraries. The one or more shuttle pathways connect the stations in a multi-drop arrangement.

19 Claims, 4 Drawing Sheets

CREATING A SINGLE LIBRARY IMAGE FROM MULTIPLE INDEPENDENT TAPE LIBRARIES

RELATED APPLICATIONS

This application is a continuation of U.S. patent application Ser. No. 12/895,742, filed Sep. 30, 2010 now U.S. Pat. No. 8,767,334, which is herein incorporated by reference.

BACKGROUND

The present invention relates to data storage systems, and more particularly, this invention relates to a system for creating a single library image from multiple independent tape libraries.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

The largest tape archives in the world, if they were to store all the data that the users demanded, would use more tape cartridges than there are available, e.g., these systems would exceed the maximum tape cartridge counts of the largest tape libraries offered in the market. However, the storage demands of these archives are met by using multiple tape libraries. The most cost-effective way to implement multiple tape libraries is to physically connect these multiple libraries via a "pass-thru" which is capable of carrying one or more tape cartridges between the libraries to deal with access "hot spots." An access hot spot is a term which describes a situation where one library experiences a peak in access demand for the tape cartridges stored therein. In these situations, the pass-thru is utilized to offload a portion of the assigned work to tape drives in another, under-utilized and connected library(ies).

The aggregation of these connected libraries then creates a "single library image" which can be utilized by higher level applications, rather than relying on a trying to deal with a plurality of library images, numbering N. In the past, the pass-thru technology has been limited to point-to-point connection and cartridge movement between established pairs of libraries. When larger images are being used, if the demand increased on both libraries of a pair, to lessen the load, a tape cartridge may be moved through one or more intermediary libraries to arrive at an under-utilized library. These may be visualized as the tape equivalent of "connecting flights" that are made from a source library, through intermediary library(ies), and finally arriving at the destination library. Therefore, in order to speed up each transfer between libraries and also to support a much higher degree of parallelism in the system, a simple cost-effective method and or system capable of direct access to the plurality of tape libraries would be very beneficial.

BRIEF SUMMARY

A system according to one embodiment includes a plurality of logical libraries configured to store sequential access media therein, a plurality of shuttle cars, and one or more shuttle pathways for the shuttle cars. The shuttle cars are for transporting a sequential access medium between the plurality of logical libraries. Each of the logical libraries comprises at least one local station for sending and/or receiving shuttle cars to and/or from the plurality of logical libraries. The one or more shuttle pathways connect the stations in a multi-drop arrangement.

A method according to one embodiment includes requesting access to a media drive located at a first station for loading a media cartridge therein, wherein the media cartridge is physically located at a second station, and receiving a response indicating a unidirectional address specified in the response. Each destination station is represented by a unique export-only address, and all source stations are represented by a common import-only address.

A method according to another embodiment includes requesting access to a media drive located at a first station for loading a media cartridge therein, wherein the media cartridge is physically located at a second station, receiving a response indicating a multi-drop unidirectional address specified in the response, and instructing a shuttle car to physically move the media cartridge from the second station to the first station via one or more shuttle pathways that connect the stations in a multi-drop arrangement that allows for direct transfers of media cartridges between the stations.

Other aspects and embodiments of the present invention will become apparent from the following detailed description, which, when taken in conjunction with the drawings, illustrate by way of example the principles of the invention.

DETAILED DESCRIPTION

Figure 1:
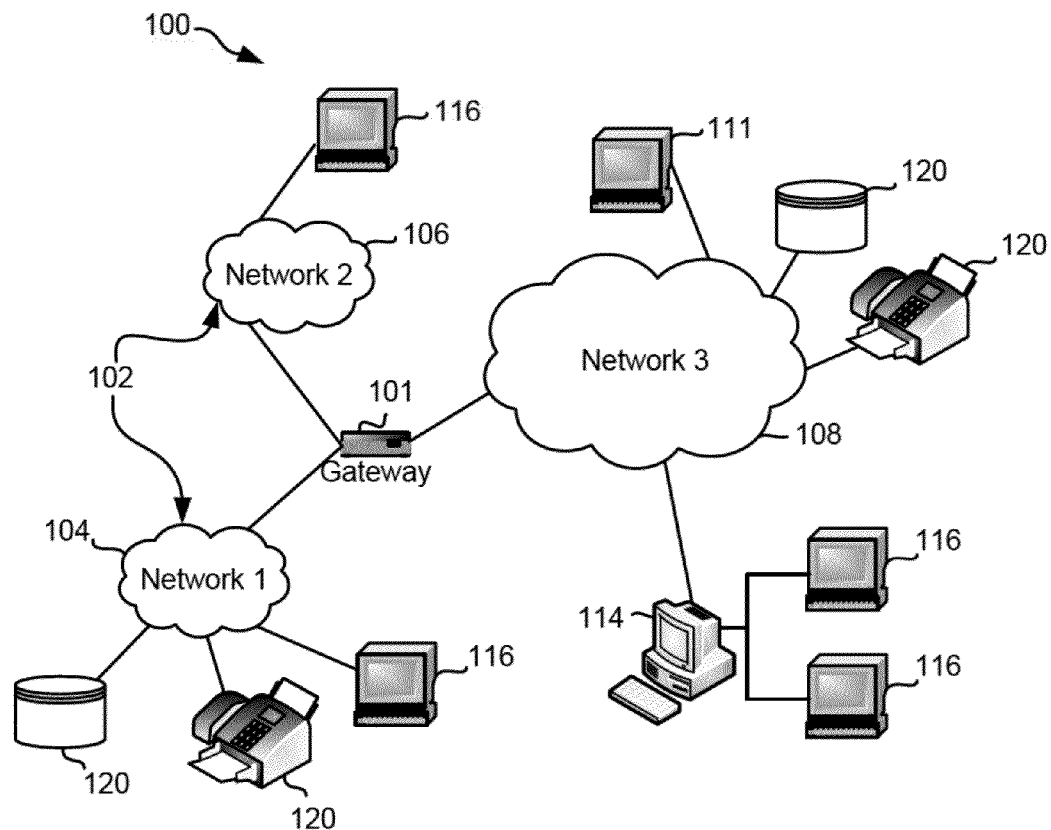
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage systems, as well as operation and/or component parts thereof.

In one general embodiment, a system includes a library manager for communicating with a plurality of logical libraries having data organized therein and stored on sequential access media therein, wherein the library manager controls movement operations of a plurality of shuttle cars along one or more shuttle pathways, wherein each of the shuttle cars are for transporting a sequential access medium between any of the plurality of logical libraries, wherein each of the logical libraries comprises at least one local station for sending and/or receiving shuttle cars to and/or from the plurality of logical libraries, wherein the one or more shuttle pathways connect the stations in a multi-drop arrangement, wherein, each destination station is represented by a unique export-only address, and wherein all source stations are represented by a common import-only address.

In another general embodiment, a method includes requesting access to a media drive located at a first station for loading a media cartridge therein, wherein the media cartridge is physically located at a second station, and receiving a response indicating a multi-drop unidirectional address specified in the response, wherein a shuttle car physically moves the media cartridge from the second station to the first station.

In another general embodiment, a computer program product for managing at least one logical library includes a computer readable storage medium having computer readable program code embodied therewith, the computer readable program code including computer readable program code configured to request access to a media drive located at a first station for loading a media cartridge therein, wherein the media cartridge is physically located at a second station, and computer readable program code configured to receive a response indicating a multi-drop unidirectional address specified in the response, wherein a shuttle car physically moves the media cartridge from the second station to the first station.

In another general embodiment, a system includes a plurality of logical libraries, each logical library including at least one sequential access media drive, at least one local station for sending and/or receiving shuttle cars to and/or from the plurality of logical libraries, and sequential access media for storing data therein. The system also includes a library manager for communicating with the plurality of logical libraries, wherein the library manager controls movement operations of a plurality of shuttle cars along one or more shuffle pathways, wherein each of the shuttle cars are for transporting a sequential access medium between any of the plurality of logical libraries, wherein the one or more shuttle pathways connect the stations in a multi-drop arrangement, wherein each destination station is represented by a unique export-only address, wherein all source stations are represented by a common import-only address, and wherein an import element address for a sequential access medium transferred from a first station is different than an export element address for the sequential access medium transferred to the first station.

According to one embodiment, a multi-drop physical connection that allows the tape equivalent of "direct flights" between any pair of libraries in the image is presented. This multi-drop physical connection allows for faster transfers between libraries and also supports a much higher degree of parallelism in the system since intermediary libraries are not involved in some of the transfers and since multi-drop connections scale much more cost-effectively than a point-to-point system. This system, in one embodiment, can cost-effectively discover and manage all of the possible logical connections with increased parallelism in the system, than conventional, point-to-point systems.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit, and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

FIG. 1 illustrates a network architecture 100, in accordance with one embodiment, in the context of the present network architecture 100, the networks 104, 106 may each take any form including, but not limited to a LAN, a WAN such as the Internet, WLAN, PSTN, internal telephone network, etc.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
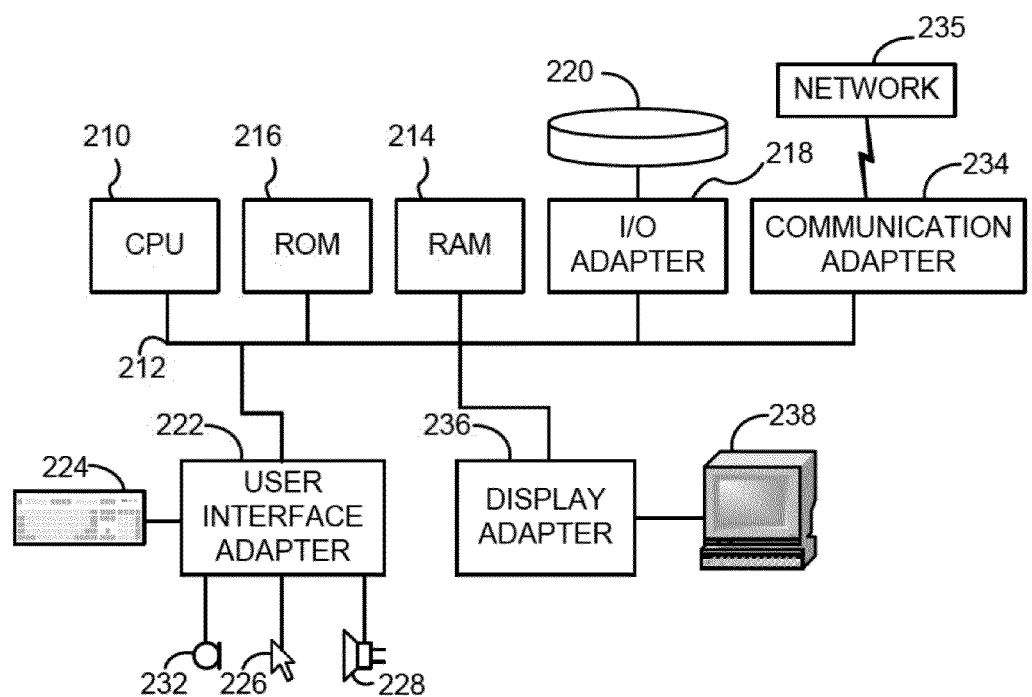
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used. An interface 134 may also be provided for communication between the tape drive and a host (integral or external) to send and receive the data and for controlling the operation of the tape drive and communicating the status of the tape drive to the host, all as will be understood by those of skill in the art.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element earned on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

Figure 3:
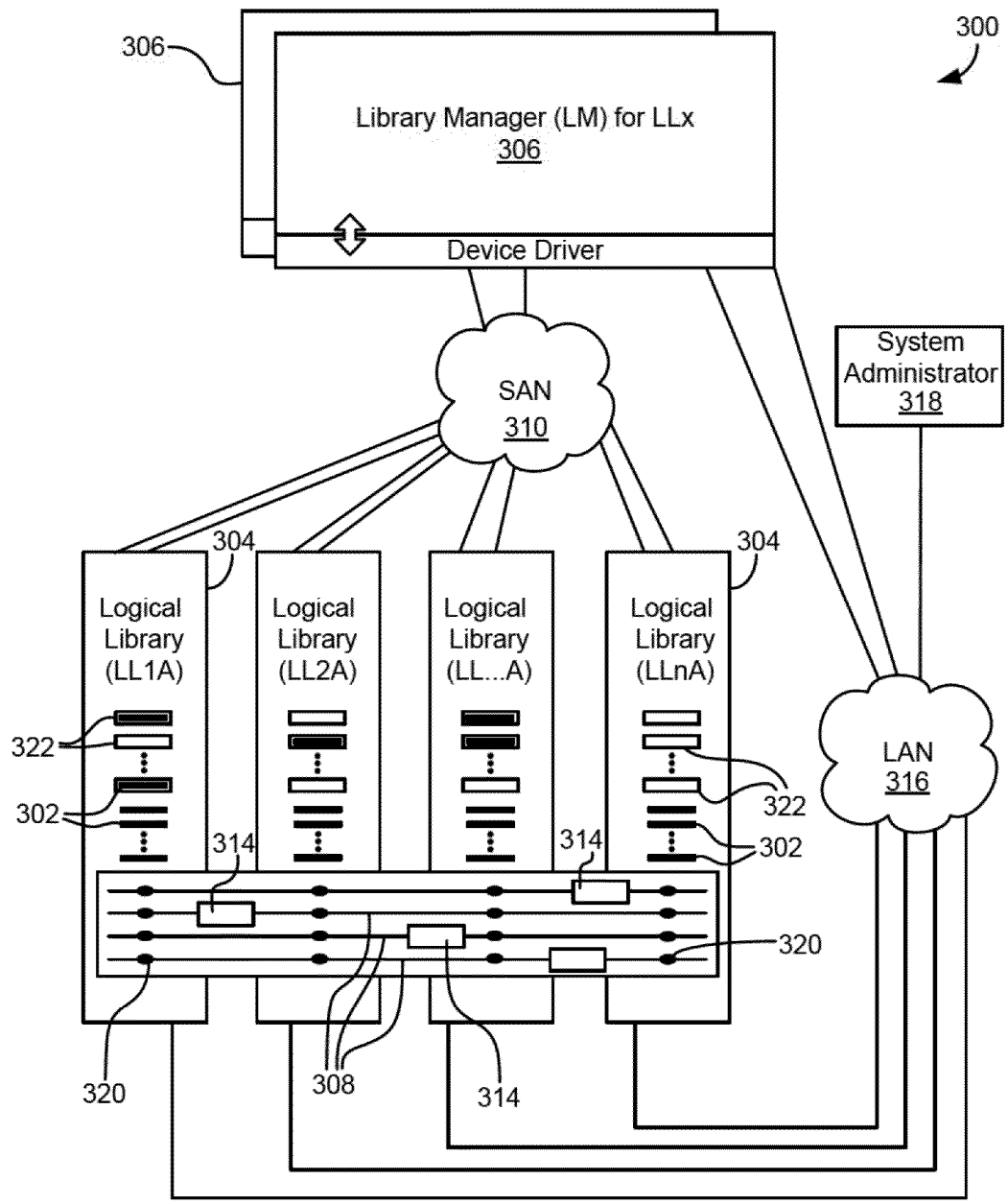
FIG. 3 shows an illustrative system, according to one embodiment.

Now referring to FIG. 3, a system 300 is shown according to one embodiment. Note that some of the elements shown in FIG. 3 may be implemented as hardware and/or software, according to various embodiments. The system 300 includes a Library Manager (LM) 306 for communicating with a plurality of Logical Libraries 304 having data organized therein and stored on sequential access media 302 therein, and for managing movement operations of a plurality of shuttle cars 314 along one or more shuttle pathways 308. Each of the Logical Libraries 304 may include at least one local station 320 for sending and/or receiving shuttle cars 314 to and/or from the plurality of Logical Libraries 304. Each of the shuttle cars 314 are for transporting a sequential access medium. 302 between any of the stations 320, and the shuttle pathways 308 connect the stations 320 in a multi-drop arrangement.

A source station is one which is sending a sequential access medium to a destination station, according to one approach. For each local station 320 in a Logical Library 304, each of the possible destination stations are represented by a unique export-only address, and all possible source stations are represented by a common import-only address.

The Library Manager 306 may be implemented, for example, on a server with software and/or logic, integrated into a physical library, etc. An illustrative Library Manager 306 that may be modified to include the features and or operations disclosed herein includes Automated Cartridge System Library Software (ACSLS) from Oracle Corporation, 500 Oracle Parkway, Redwood Shores, Calif. 94065. The Logical Libraries 304 in some approaches may include a set of data organizations which may be physical or logical.

In one embodiment, the system 300 may also include logic operable to instruct one of the shuttle cars 314 to transfer a first sequential access medium 302 from a first station (such as one located in Logical Library LL1A) to a second station (such as one located in Logical Library LL2A). Each of the Logical Libraries 304 may include at least one sequential access media drive 322, and each station 320 may have access to one or more sequential access media drives 322. The one or more shuttle pathways 308 may also allow for direct transfers of sequential access media 302 between any of fee stations 320, in another approach.

According to one embodiment, the first sequential access medium may be transferred when each of the at least one drive of the first Logical Library is in use, and the system 300 may also include logic operable to cause the at least one drive of the second Logical Library to read and/or write from and/or to the first sequential access medium, e.g., after the medium, is received at a station of the second Logical Library.

In one embodiment, the sequential access media 302 may be magnetic tape media housed in magnetic tape cartridges.

In some embodiments, the system 300 may also include a first network, such as a Storage Area Network (SAN) 310 connecting the Library Manager 306 to the plurality of Logical Libraries 304 and connecting the Library Manager 306 to the shuttle pathways 308.

In more embodiments, the system 300 may include a second network, such as a Local Area Network (LAN) 316 connecting the plurality of Logical Libraries 304, and the Library Manager 306 to a system administrator 318 for controlling operations thereof. The system administrator 318 may be a terminal, a computer system, a processor, etc., and may be controlled by an operator thereof for some or all commands.

The sequential access media drives 322 may be used to access data stored on a plurality of sequential access media 302 for storing data that is organized into the Logical Libraries 304, in one approach.

Additionally, in some approaches, the multi-drop unidirectional address may be a unique unidirectional connected media changer (CMC) import/export element (EE) address, as described previously. In some approaches, each of the local stations may have the capability of representing 15 potential destinations, but of course, more or less connections may be possible, and each local station may not have the maximum number of connections. In more approaches, each of the plurality of Logical Libraries 304 may have up to 16 local stations, but of course, more or less local stations may be included for each Logical Library 304.

According to another embodiment, the plurality of sequential access media 302 may be magnetic tape, optical media, etc. Each sequential access media 302 may be readable by a sequential access media drive 322, according to one approach, such as a tape drive, optical drive, etc.

In one approach, commands from the Library Manager 306 may be transmitted to the plurality of Logical Libraries 304 over at least one network connection, and commands from the Library Manager 306 may be transmitted to the shuttle pathways 308 over the at least one network connection.

In another approach, the system 300 may include logic for creating a mapping of multi-drop unidirectional addresses representing the stations 320. The mapping may use unidirectional addressing to represent all possible transfers of sequential access media 302 between the stations 320.

According to another approach, command line instructions from a system administrator 318 to at least one of the Library Manager 306 and the plurality of Logical Libraries 304 may be executed by the at least one of the Library Manager 306 and the plurality of Logical Libraries 304. This allows an operator, working from the system administrator 318, to control operations of the system 300, either through the Library Manager 306 or the plurality of Logical Libraries 304, in some approaches.

In yet another approach, an import element address for a sequential access medium 302 transferred from a first station (such as a station in Logical Library LL1A) may be different than an export element address for the sequential access medium 302 transferred to the first station.

Each library string may support up to 16 local stations (1 per active frame), according to one embodiment. Each local station may support up to 15 potential destinations (including a round-trip back to itself), in one approach. Each destination may be addressable as a CMC IEE address of 2XZh where X represents the X-axis of the sending library string and Z represents the Z-axis for that specific connection, according to one approach. Thus a single connection may be reported as shown in Table 1, below, in one embodiment. In each Logical Library, however, the X value may be different, since it is unique to the sending (reporting) library string, in preferred embodiments.

TABLE 1

| | | | |
|---|---|---|---|
| 2X1h | 2X2h | 2X3h | 2X4h |
| ID = AAA | ID = BBB | ID = CCC | ID = DDD |
| 2X5h | 2X6h | 2X7h | 2X8h |
| ID = EEE | ID = FFF | ID = GGG | ID = HHH |
| 2X9h | 2XAh | 2XBh | 2XCh |
| ID = JJJ | ID = KKK | ID = LLL | ID = MMM |
| 2XDh | 2XEh | 2XFh | |
| ID = NNN | ID = OOO | ID = PPP | |

To further elaborate, the SCSI standard allows import/export element addressing to be bidirectional (import and export via the same address) or unidirectional (import-only or export-only). The standard seems to assume (but does not require) that element addressing for connected medium changers is bidirectional since this is the typical mechanical implementation.

Virtualizing a single N-drop connection with bidirectional addressing, using conventional techniques, would require $N*(N-1)/2$ unique identifiers $(1+2+3 \ldots +N)$. A connection to 15 shuttle stations (library strings) would require 105 unique identifiers. Furthermore, this requires that the transport of a cartridge include communicating the source station identity in order to properly report cartridge arrival at the bidirectional address uniquely tied to the source station. This source station identity either must be stored in more expensive nonvolatile storage during transport or accommodations must be made to handle the volatility of this information, e.g., a power loss during transport of a cartridge.

Accordingly, for a first library at Z-axis position 3 on a multi-drop connection, address 2X0 for the first library is an import-capable address that is used for detecting the arrival of a cartridge from any other library, in one approach. However, address 2X3 reported by all other libraries on the same multi-drop connection is an export-only address representing the destination of the first library, in the same approach. With this approach, a unique identifier can be associated with the destination (in this example, the first library) and only N unique identifiers are required for a single N-drop connection.

In one embodiment, the mapping uses unidirectional addressing to represent all possible transfers across the multi-drop implementation. Thus, the element address for the import of a cartridge from a first library is different from the element address for the export of a cartridge to the first library. However, a single import address is used per local station for the import of a cartridge from any potential source station (source-agnostic import addressing), in some approaches. With this approach, the import-only address need only have a unique identifier that is associated with the local station, according to one embodiment. Furthermore, the transport of a cartridge does not include communicating the source station identity, in some embodiments, which reduces cost and/or complexity.

Figure 4:
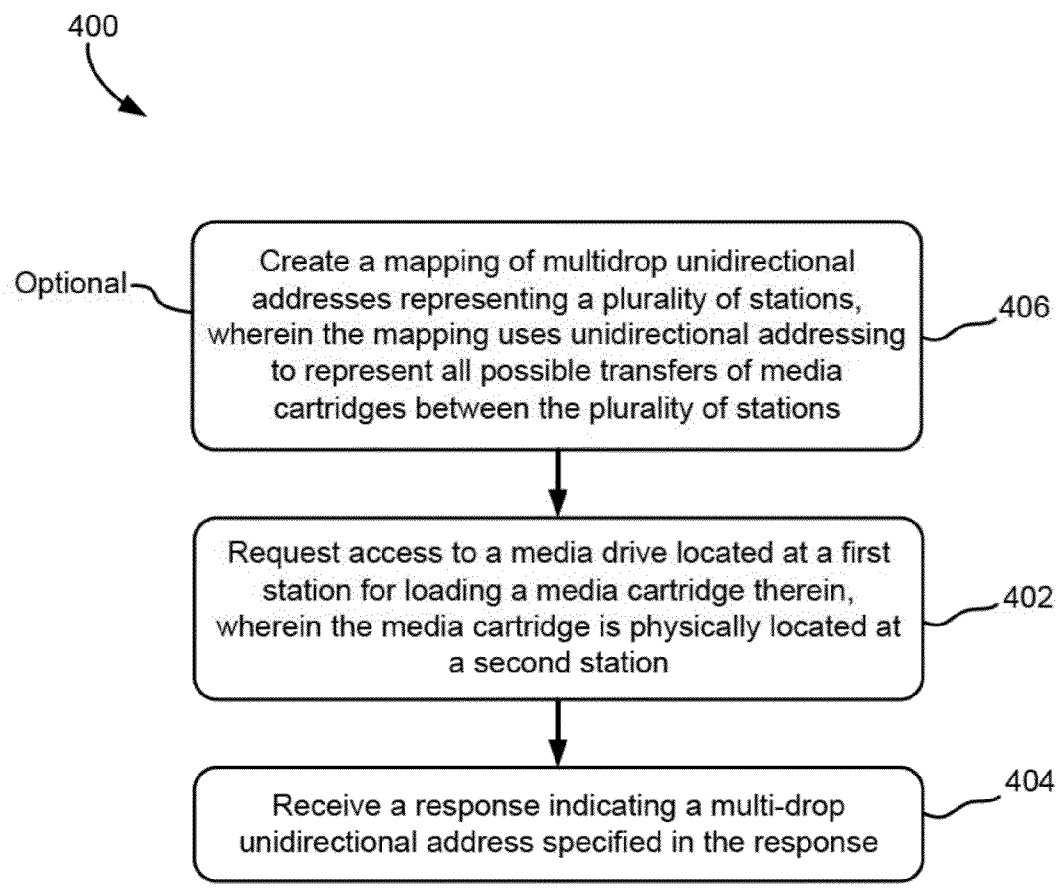
FIG. 4 shows a method for combining components of a plurality of logical libraries into a single image library, according to one embodiment.

Now referring to FIG. 4, a method 400 is shown according to one embodiment. The method 400 may be carried out in any desired environment, including but not limited to, those shown in FIGS. 1-3, according to various embodiments. Of course, the method 400 may include more or less operations than those described below, and shown in FIG. 4, as would be known to one of skill in the art.

In one preferred embodiment, the operations in FIG. 4, including any optional operations as one of skill in the art may choose to implement, may be carried out by a Library Manager, as described previously.

In operation 402, access is requested to a media drive located at a first station for loading a media cartridge therein, with the media cartridge being physically located at a second station.

Each of the stations may be located in one of a plurality of Logical Libraries, with each Logical Library being represented by a dedicated Library Manager, according to one embodiment. However, these dedicated Library Managers may be rendered moot once an overall Library Manager is established, or they may continue to function partially or fully under the control of the overall Library Manager.

In operation 404, a response is received indicating a multi-drop unidirectional address specified in the response. This response may be sent by the Logical Library, a Library Manager associated with the Logical. Library, or any other system, device, etc.

The multi-drop unidirectional address specified in the response may be based on any factor, as would be known in the art, such as location, proximity to the first Logical Library, loading in the Logical Library having the available chive, etc.

In another embodiment, the method 400 may include checking for locked shuttle cars that are not being used and causing any locked shuttle cars not being used to become unlocked. This frees up shuttle cars for use when they are unnecessarily being locked, speeding up the process of data access in the system. In some further embodiments, the checking may be performed in any number of ways as known in the art, such as periodically (every so often, every 1/10 second, every second, every 10 seconds, etc.), after each shuttle car call, after a predetermined number of shuttle car calls, etc.

According to one approach, the media drives may preferably be magnetic tape drives and the media cartridges may preferably be magnetic tape cartridges. Of course, other types of media and media drives may also be used, as known to one of skill in the art.

In one approach, the method 400 may include optional operation 406, where a mapping is created of multi-drop unidirectional addresses representing a plurality of stations, wherein the mapping uses unidirectional addressing to represent all possible transfers of media cartridges between the plurality of stations.

In another approach, an import element address for the media cartridge transferred from the second station may be different than an export element address for the media cartridge transferred to the second station.

In another embodiment, a computer program product for combining components of at least one Logical Library into a single image library is presented. The computer program product may be implemented in any fashion as described in FIGS. 1-3, or as known in the art.

In one embodiment, the computer program product comprises a computer readable storage medium having computer readable program code embodied therewith. The computer readable program code includes computer readable program code configured to request access to a media drive located at a first station for loading a media cartridge therein, wherein the media cartridge is physically located at a second station, and computer readable program code configured to receive a response indicating a multi-drop unidirectional address specified in the response. As previously described, a shuttle car physically moves the media cartridge from the second station to the first station.

In additional embodiments, the computer readable program code may include computer readable program code configured to check for locked shuttle cars that are not being used, and computer readable program code configured to cause any locked shuttle cars not being used to become unlocked. The checking may be performed periodically, after each shuttle car call, alter a predetermined number of shuttle car calls, etc.

In another embodiment, the computer readable program code may include computer readable program code configured to create a mapping of multi-drop unidirectional addresses representing a plurality of stations, wherein the mapping uses unidirectional addressing to represent all possible transfers of media, cartridges between the plurality of stations.

In another embodiment, the computer readable program code may include computer readable program code configured to support a floating home logical library for each media cartridge that is moved between logical libraries, as previously described.

According to another embodiment, an import element address for the media cartridge transferred from the second station is different than an export element address for the media cartridge transferred to the second station.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a plurality of logical libraries configured to store sequential access media therein;
a plurality of shuttle cars; and
one or more shuttle pathways for the shuttle cars,
wherein the shuttle cars are configured to transport a sequential access medium between the plurality of logical libraries, wherein each of the logical libraries comprises at least one local station configured to send and/or receive shuttle cars to and/or from the plurality of logical libraries, wherein the one or more shuttle pathways connect the stations in a multi-drop arrangement, wherein all source stations are represented by a common import-only address, and wherein a source station is a station from which a sequential access medium is sent.

2. The system of claim 1, wherein each destination station is represented by a unique export-only address, and wherein a destination station is a station at which the sequential access medium is received.

3. The system of claim 2, wherein an import element address for a sequential access medium transferred from a first station is different than an export element address for the sequential access medium transferred to the first station.

4. The system of claim 1, further comprising a library manager configured to communicate with the plurality of logical libraries having data organized therein and stored on the sequential access media therein and control movement operations of the plurality of shuttle cars along the one or more shuttle pathways.

5. The system of claim 1, further comprising:
logic operable to instruct one of the shuttle cars to transfer a first sequential access medium from a first logical library to a second logical library, wherein each of the logical libraries comprises at least one sequential access media drive, wherein the one or more shuttle pathways allow for direct transfers of sequential access media between the plurality of logical libraries.

6. The system of claim 5, wherein the first sequential access medium is transferred when each of the at least one drive of the first logical library is in use, and further comprising logic operable to cause the at least one drive of the second logical library to read and/or write from and/or to the first sequential access medium.

7. The system of claim 5, further comprising logic configured to create a mapping of multi-drop unidirectional addresses representing the stations, wherein the mapping uses unidirectional addressing to represent all possible transfers of sequential access media between the stations.

8. The system of claim 7, wherein an import element address for a sequential access medium transferred from a first station is different than an export element address for the sequential access medium transferred to the first station.

9. The system of claim 7, wherein each multi-drop unidirectional address comprises a unique unidirectional connected media changer (CMC) import/export element (IEE) address.

10. A method, comprising:
requesting access to a media drive located at a first station for loading a media cartridge therein, wherein the media cartridge is physically located at a second station; and
receiving a response indicating a unidirectional address specified in the response, wherein each destination station is represented by a unique export-only address, a destination station being a station at which a sequential access medium is received, and wherein all source stations are represented by a common import-only address, a source station being a station from which the sequential access medium is sent.

11. The method of claim 10, further comprising creating a mapping of multi-drop unidirectional addresses representing a plurality of stations, wherein the mapping uses unidirectional addressing to represent all possible transfers of media cartridges between the plurality of stations.

12. The method of claim 10, wherein a shuttle car physically moves the media cartridge from the second station to the first station.

13. The method of claim 10, wherein an import element address for the media cartridge transferred from the second station is different than an export element address for the media cartridge transferred to the second station.

14. A method, comprising:
requesting access to a media drive located at a first station for loading a media cartridge therein, wherein the media cartridge is physically located at a second station;
receiving a response indicating a multi-drop unidirectional address specified in the response, wherein all possible transfers of media cartridges between the first station and the second station utilizes unidirectional addressing; and
instructing a shuttle car to physically move the media cartridge from the second station to the first station via one or more shuttle pathways that connect the stations in a multi-drop arrangement that allows for direct transfers of media cartridges between the stations,
wherein an import element address for the media cartridge when transferred from the first station is different than an export element address for the media cartridge when transferred to the first station.

15. The method of claim 14, further comprising creating a mapping of multi-drop unidirectional addresses representing a plurality of stations, wherein the mapping uses unidirectional addressing to represent all possible transfers of media cartridges between the plurality of stations.

16. The method of claim 14, wherein an import element address for the media cartridge transferred from the second station is different than an export element address for the media cartridge transferred to the second station.

17. The method of claim 14, wherein each destination station is represented by a unique export-only address, a destination station being a station at which a sequential access medium is received.

18. The method of claim 17, wherein all source stations are represented by a common import-only address, a source station being a station from which the sequential access medium is sent.

19. The method of claim 14, wherein the multi-drop unidirectional address comprises a unique unidirectional connected media changer (CMC) import/export element (IEE) address.

* * * * *